United States Patent [19]
Vawter et al.

[11] Patent Number: 5,745,630
[45] Date of Patent: Apr. 28, 1998

[54] CUTOFF-MESA ISOLATED RIB OPTICAL WAVEGUIDE FOR III-V HETEROSTRUCTURE PHOTONIC INTEGRATED CIRCUITS

[75] Inventors: Gregory A. Vawter; Robert E. Smith, both of Albuquerque, N. Mex.

[73] Assignee: Sandia Corporation, Albuquerque, N. Mex.

[21] Appl. No.: 603,841

[22] Filed: Feb. 22, 1996

[51] Int. Cl.⁶ ........................................ G02B 6/10
[52] U.S. Cl. ............................ 385/129; 385/4
[58] Field of Search ................ 385/2, 3, 4, 129, 385/130, 131, 132, 133, 134

[56] References Cited

U.S. PATENT DOCUMENTS

| | | | |
|---|---|---|---|
| 4,725,112 | 2/1988 | Bridges et al. | 372/46 X |
| 4,764,246 | 8/1988 | Bridges et al. | 372/45 |
| 4,997,246 | 3/1991 | May et al. | 385/2 |
| 5,004,313 | 4/1991 | Ty Tan et al. | 385/2 |
| 5,143,577 | 9/1992 | Hass et al. | 385/2 |
| 5,157,748 | 10/1992 | Mueller et al. | 385/131 |
| 5,263,111 | 11/1993 | Nurse et al. | 385/130 |
| 5,468,689 | 11/1995 | Cunningham et al. | 385/131 X |

*Primary Examiner*—Akm E. Ullah
*Attorney, Agent, or Firm*—Gregory A. Cone

[57] ABSTRACT

A cutoff mesa rib waveguide provides single-mode performance regardless of any deep etches that might be used for electrical isolation between integrated electrooptic devices. Utilizing a principle of a cutoff slab waveguide with an asymmetrical refractive index profile, single mode operation is achievable with a wide range of rib widths and does not require demanding etch depth tolerances. This new waveguide design eliminates reflection effects, or self-interference, commonly seen when conventional rib waveguides are combined with deep isolation etches and thereby reduces high order mode propagation and crosstalk compared to the conventional rib waveguides.

19 Claims, 4 Drawing Sheets

CUTOFF-MESA ISOLATED RIB OPTICAL WAVEGUIDE FOR III-V HETEROSTRUCTURE PHOTONIC INTEGRATED CIRCUITS

This invention was made with Government support under Contract DE-AC04-94AL85000 awarded by the U.S. Department of Energy. The Government has certain rights in the invention.

BACKGROUND OF THE INVENTION

Photonic integrated circuits (PICs) are attractive for their potential to perform complex coherent modulation and demodulation functions, generate complex switching meshes and fill other optical communication and signal processing functions. Most PIC applications require single-moded waveguide structures in order to meet the needs of coherent communications systems. These waveguides have typically been either strip-loaded [see: H. Takeuchi and K. Oe, "Low-loss single-mode GaAs/AlGaAs miniature optical waveguides with straight and bending structures," IEEE J. Lightwave Technol., vol. 7, pp. 1044-1054, July 1989 and G. Wenger, L. Stoll, B. Weiss, M. Schienle, R. Muller-Nawrath, S. Eichinger, J. Muller, B. Acklin and G. Muller, "Design and fabrication of monolithic optical spot size transformers (MOST's) for highly efficient fiber-chip coupling," IEEE J. Lightwave Technol., vol. 12, pp. 1782-1790, October 1994, which both employ etched or deposited ribs; and C. T. Sullivan, S. D. Mukherjee, M. K. Hibbs-Brenner, A. Gopinath, E. Kalweit, T. Marta, W. Goldberg and R. Walterson, "Switched time delay elements based on AlGaAs/GaAs optical waveguide technology at 1.32 μm for optically controlled phased array antennas", in Optical Technology for Microwave Applications VI and Optoelectronic Signal Processing for Phased-Array Antennas III, Proc. SPIE, vol. 1703, pp. 264-271, 1992 which employs deeply etched designs; and Y. Shani, U. Koren, B. Miller, M. Young, M. Oron and R. Alferness, "Buried rib passive waveguide Y junctions with sharp vertex on InP," IEEE Phot. Technol. Lett., vol. 3, pp. 210-212, March 1991 which employs a buried heterostructure design].

Conventional strip-loaded rib waveguides support guided slab modes outside the actual rib resulting in high crosstalk between adjacent guides unless deep etched isolation trenches are used. When such trenches are used, these same slab modes cause self-interference,—i.e. "beating" between the fundamental rib mode 20 and higher order modes bound to the etched slab waveguide. The structures shown in FIGS. 2A and 2B illustrate the root cause of this self-interference. Whereas the fundamental "rib" mode 20 is seen bound to the rib 21 of a strip-loaded waveguide, the first higher-order "mesa" mode 22 is bound by an etched mesa such as might be used to isolate one rib from the next. Light scattered out of the fundamental mode is likely to be captured by these higher-order mesa modes where it is guided alongside the rib or can scatter back into the rib mode. Such high-order modes prevent effective coherent beam combining in PICs with structures such as waveguide y-junctions since power meant to radiate out of the fundamental mode is captured by the mesa modes.

SUMMARY OF THE INVENTION

We have designed and demonstrated a single-mode semiconductor rib optical waveguide which differs from these conventional structures. Our design uses a highly asymmetric vertical refractive index profile in the growth direction outside the rib 10 to form a cutoff slab waveguide 12 which does not support guided slab modes unless an upper rib of cladding material is introduced to reduce the asymmetry in the growth direction, permitting guiding of light under the rib as shown in FIG. 1B. The cutoff mesa rib waveguide of the present invention is a fundamental departure from the prior art strip-loaded rib waveguide in that the two-dimensional slab of high refractive index material underlying a rib waveguide forms a slab waveguide in the strip-loaded structure but is intentionally designed as a non-guiding cutoff waveguide in the cutoff mesa structure. The use of the cutoff slab as taught herein eliminates self-interference and reduces crosstalk, since no slab modes are supported. With the cutoff slab in place, trenches 14 are etched on either side of the rib to form a cutoff mesa, providing electrical isolation and simplified contacting of optical modulators. Although deeply etched heterostructure waveguides have been utilized in the prior art to eliminate these same effects, etching through the pn-junction depletion region immediately adjacent to a rib has been shown to cause material damage [see A. C. Papadopoulo, C. Dubon-Chevallier, J. F. Bresse, A. M. Duchenois and F. Heliot, "Etching procedures of GaAs: Cathodoluminescence study of the induced damages and of the recovering techniques," J. Vac. Sci. Technol. B, vol. B8, pp. 407-412, May/June 1990 and A. Scherer, H. G. Craighead, M. L. Roukes and J. P. Harbison, "Electrical damage induced by ion beam etching of GaAs," J. Vac. Sci. Technol. B, vol. 6, pp. 277-279, January/February 1988] and can lead to compromised electrical and optical behavior of waveguide devices such as electrooptic modulators. Epitaxial regrowth of buried heterostructures eliminates such damage to the pn junction, but is in general costly, difficult and impractical for many types of waveguide devices including AlGaAs structures.

DETAILED DESCRIPTION OF THE INVENTION

Figure 1A:
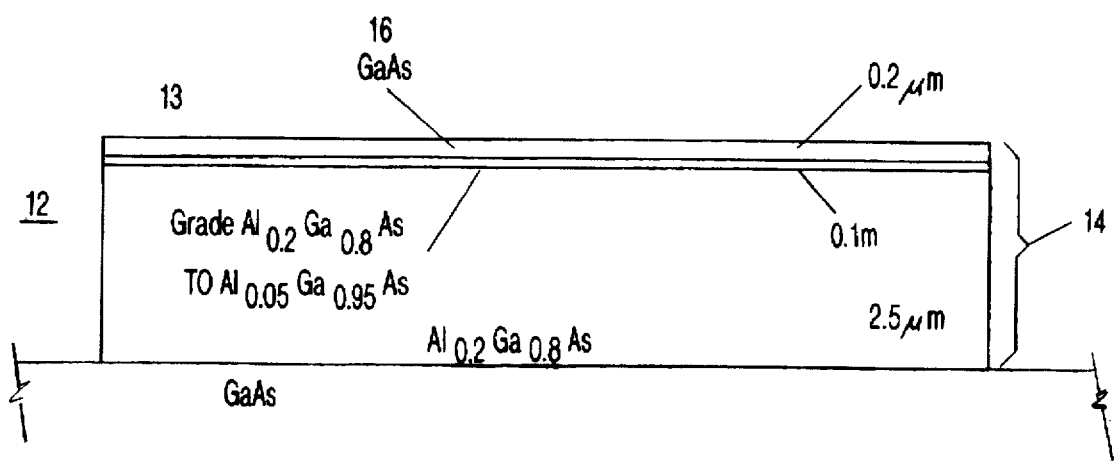
FIG. 1A is a cross section view of a cutoff slab waveguide without the rib of cladding material showing that the cutoff guide supports no guided modes by itself.
Figure 2A:
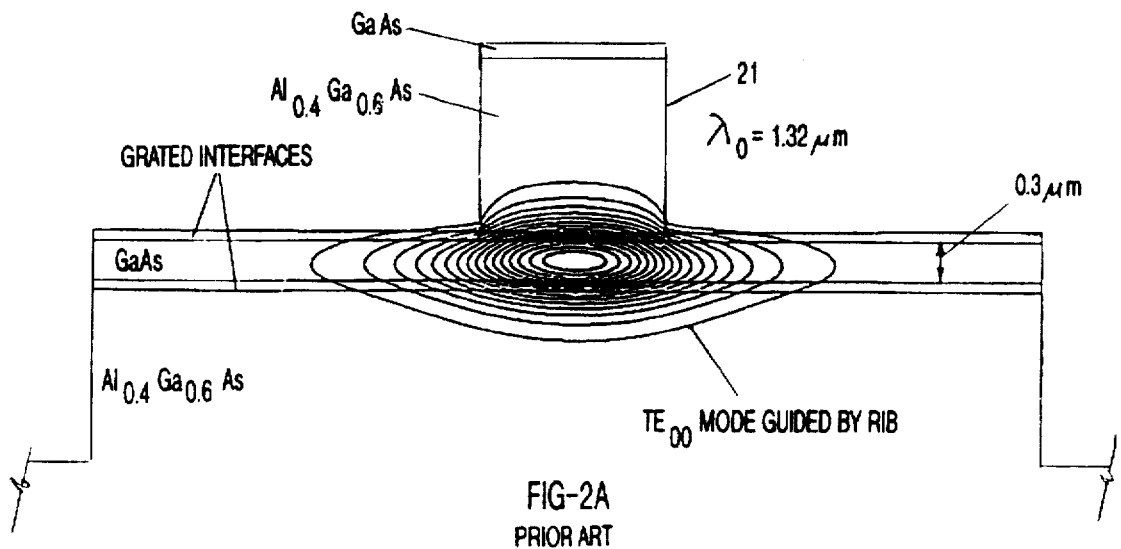
FIG. 2A is a cross section view illustrating the deep etched trench reflection effects in a conventional stripe-loaded rib waveguide of the prior art with this Figure showing only the fundamental TE mode from the single-moded rib.
Figure 2B:
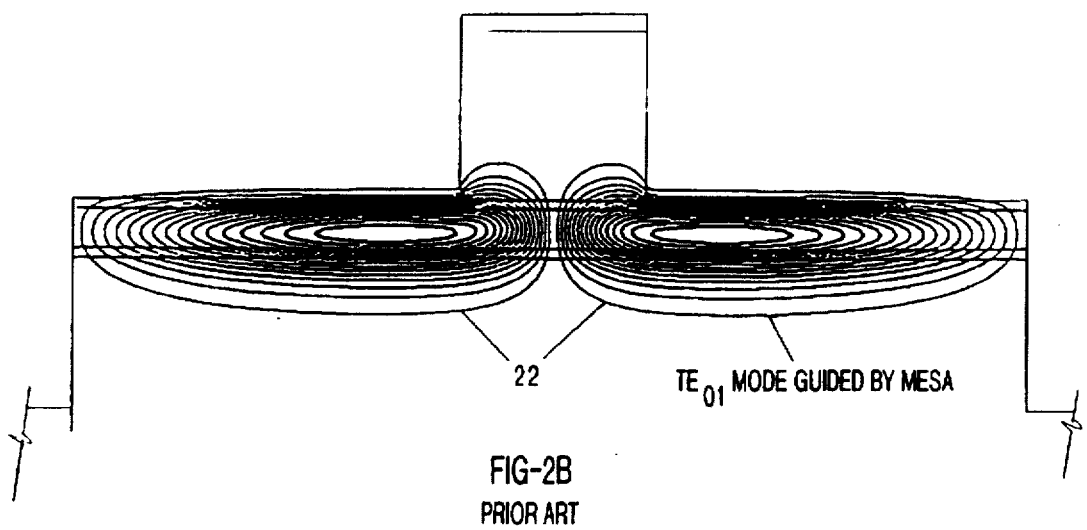
FIG. 2B shows the first of many higher-order modes induced within the prior art etched mesa by the mesa etch and guided coaxially with the central rib. This conventional waveguide produces the combined output of FIG. 2A and 2B superimposed upon each other.
Figure 3:
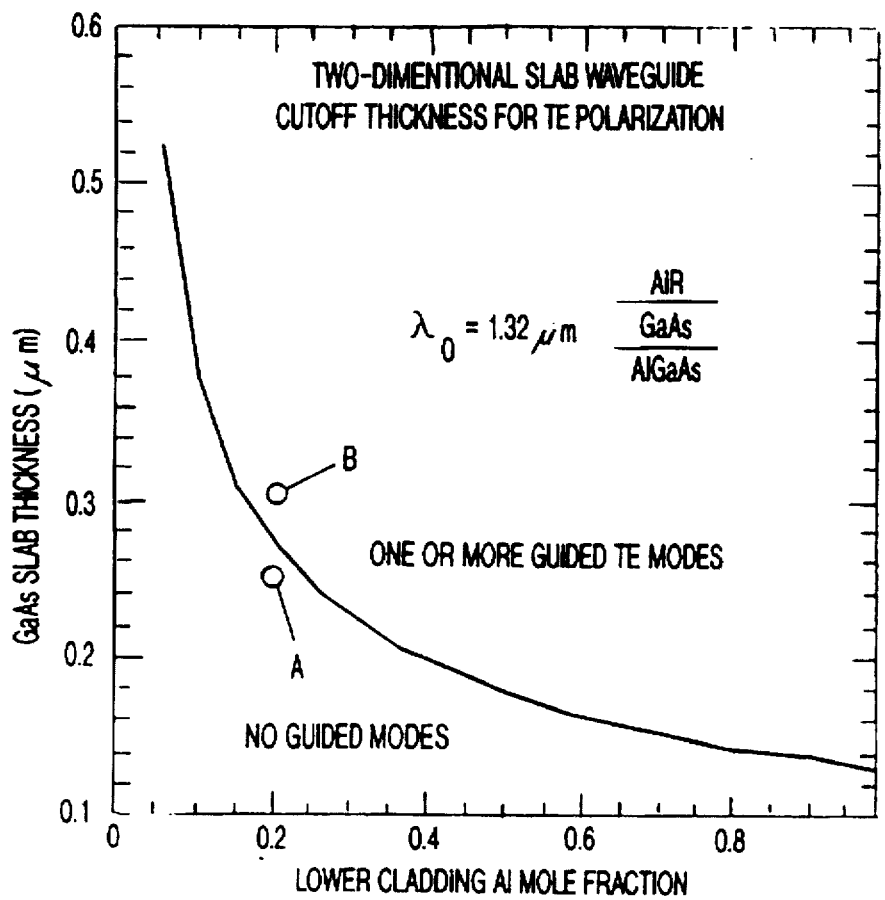
FIG. 3 is a graph showing the maximum thickness of a GaAs slab on an AlGaAs lower cladding for cutoff of optical waveguiding therein. Point A marks the design point used in the cutoff mesa rib waveguide of this invention. Point B marks the design point of the prior art waveguides in FIG. 2A and FIG. 2B.

Design of a cutoff mesa rib waveguide begins with the design of a cutoff slab waveguide. The concept of optical cutoff is discussed in many textbooks [see H. Kogelnik, "Theory of Optical Waveguides," in *Guided-Wave Optoelectronics*, T. Tamir Ed., Berlin: Springer-Verlag, 1988, pg. 15]. In short, a slab waveguide with an asymmetric refractive index profile may be designed such that the transverse resonance condition can not be satisfied and no guided modes, including the $TE_0$, will propagate along the slab. The cutoff condition for the $TE_0$ mode of a slab waveguide is given by $$t_g = \frac{\tan^{-1}\sqrt{\frac{n_0^2 - n_2^2}{n_1^2 - n_0^2}}}{\frac{2\pi}{\lambda_o}\sqrt{n_1^2 - n_0^2}}, \quad (1)$$

where $n_0$, $n_1$ and $n_2$ are the lower cladding 15, slab layer 16 and upper layer (here air) 13 refractive indices respectively. $\lambda_o$ is the free space wavelength and $t_g$ the thickness of the slab layer 16. This relation is for the case of $n_1 > n_0 > n_2$. Using (1) a curve giving an upper limit on slab waveguide thickness as a function of $\Delta n = n_1 - n_0$ may be created for a slab waveguide as in FIG. 1A. FIG. 3 shows the cutoff condition of an air/GaAs/AlGaAs slab waveguide at 1.32 μm wavelength for the $TE_0$ mode. Point A on FIG. 3 indicates the design value of an $Al_{0.2}Ga_{0.8}As$ lower cladding material 15 under a 0.25 μm thick GaAs layer 16 used in this first demonstration of a cutoff mesa rib waveguide. Point B indicates a design value for the prior art waveguide shown in FIG. 2A and FIG. 2B where the slab thickness is about 0.3 μm with the same mole fractions in the underlying lower cladding layer with several guided modes being supported in the slab layer.

Figure 1B:
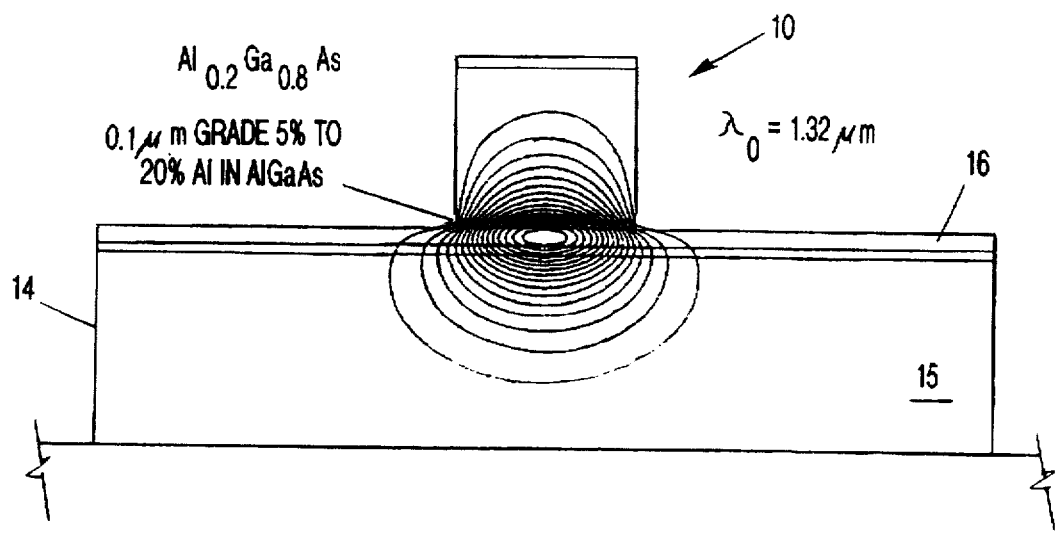
FIG. 1B is a cross section view of the cutoff slab waveguide with the added rib of cladding material showing support guided $TE_{00}$ and $TM_{00}$ modes only. Fifteen linearly spaced contours showing an electric field profile of the $TE_{00}$ mode are seen superimposed onto the 2 μm wide rib waveguide.

Following the design of the cutoff slab waveguide, a rib of upper cladding material 17 may now be designed which lies on top of the cutoff waveguide. This rib establishes both vertical and horizontal confinement and guiding of the desired optical mode. The presence of the rib allows for vertical guiding of light in the otherwise cutoff slab by reducing the asymmetry of the refractive index profile from an air/GaAs/AlGaAs structure as in FIG. 1A to an AlGaAs/GaAs/AlGaAs structure as in FIG. 1B so that, under the rib, the waveguide is no longer cutoff. Although lateral guiding does not differ significantly from standard waveguides, it is important to note that the conventional effective index method cannot be used to model the guiding properties of the cutoff mesa rib waveguide since the region outside the rib is in optical cutoff. The final rib structure was designed with a personal computer using a two-dimensional iterative finite difference technique to solve the 2D vector Helmholtz equation. This technique is described in G. R. Hadley and R. E. Smith, "Full-vector waveguide modeling using iterative method with transparent boundary conditions," IEEE J. Lightwave Technol., vol. 13, pp. 465–469, March 1995. This article is incorporated by reference in its entirety.

Figure 4:
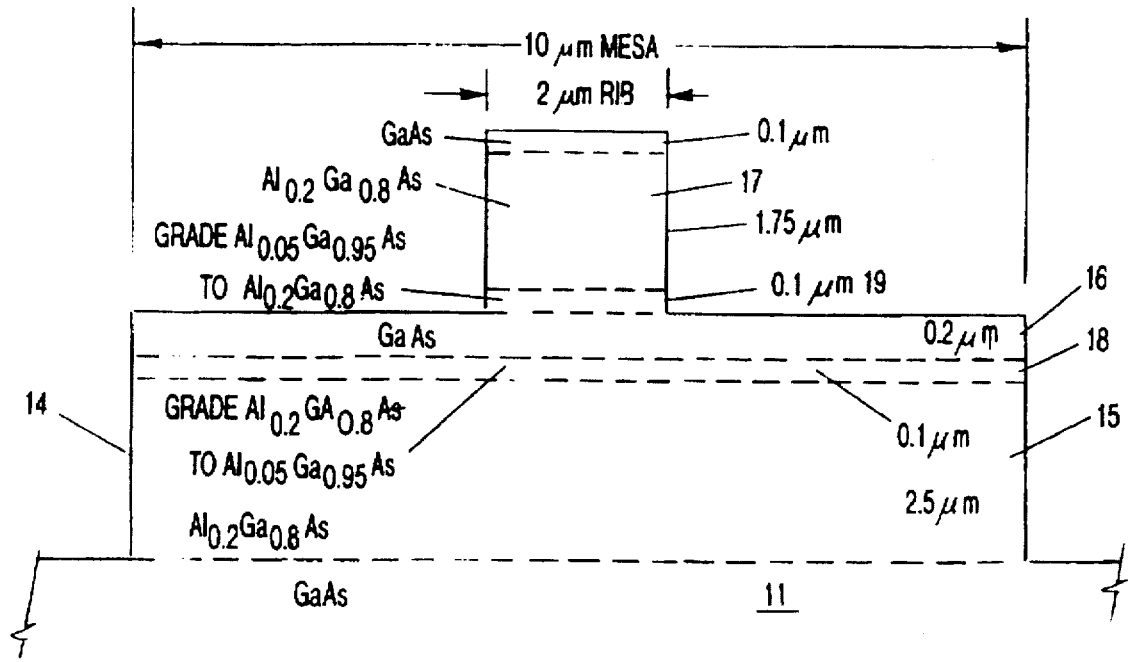
FIG. 4 is a schematic cross-section diagram an example of the complete cutoff mesa rib waveguide formed in GaAs/AlGaAs showing compositions and dimensions for the various layers of the structure for operation at a wavelength near 1.3 μm.

Since the rib waveguide design may be used with active waveguide devices such as an electrooptic modulator, the simple air/GaAs/AlGaAs cutoff slab of 0.25 μm GaAs on $Al_{0.2}Ga_{0.8}As$ may be modified by the introduction of a 0.1 μm graded interface heterojunction 18 and 19 to reduce any spikes in the conduction and valence bands and lower the device resistivity. The waveguiding behavior of a 0.25 μm GaAs layer with an abrupt interface should be essentially the same as a 0.20 μm GaAs layer with a 0.10 μm graded interface. In fact, although (1) is not strictly valid for graded interfaces, the two-dimensional numerical model verified that the resulting slab with a graded interface was still cut off. FIG. 4 shows the cross-section of the cutoff mesa rib waveguide used for this demonstration. A contour plot of the resulting $TE_{00}$ modal field profile is shown superimposed onto the waveguide cross section in FIG. 1B. An essentially identical $TM_{00}$ mode is also supported by the rib waveguide. No higher order modes of any sort are guided by the rib and cutoff mesa structure.

Elimination of the self-interference effect was investigated theoretically using three-dimensional beam propagation methods (BPM). Using a theoretical model, a variety of centered and offset gaussian TE excitation fields were launched in the structure described in FIG. 4, and the optical power distribution was calculated as the light propagated along the structure. In all cases a portion of the launched excitation fields was coupled into the $TE_{00}$ mode while the remainder radiated away from the rib. All radiated power left the modeled region through transparent boundary conditions at the mesa edges resulting in a decay of the launched fields in the structure until all remaining power was in the $TE_{00}$ mode. No light remained guided by the mesa outside the rib. The BPM model suggests a typical decay length (a propagation length along the length of the rib needed to stabilize the guided power) of approximately 500 μm for launched gaussian input fields with 0.5 to 0.75 μm 1/e radius laterally offset by 0.1 μm.

Figure 5:
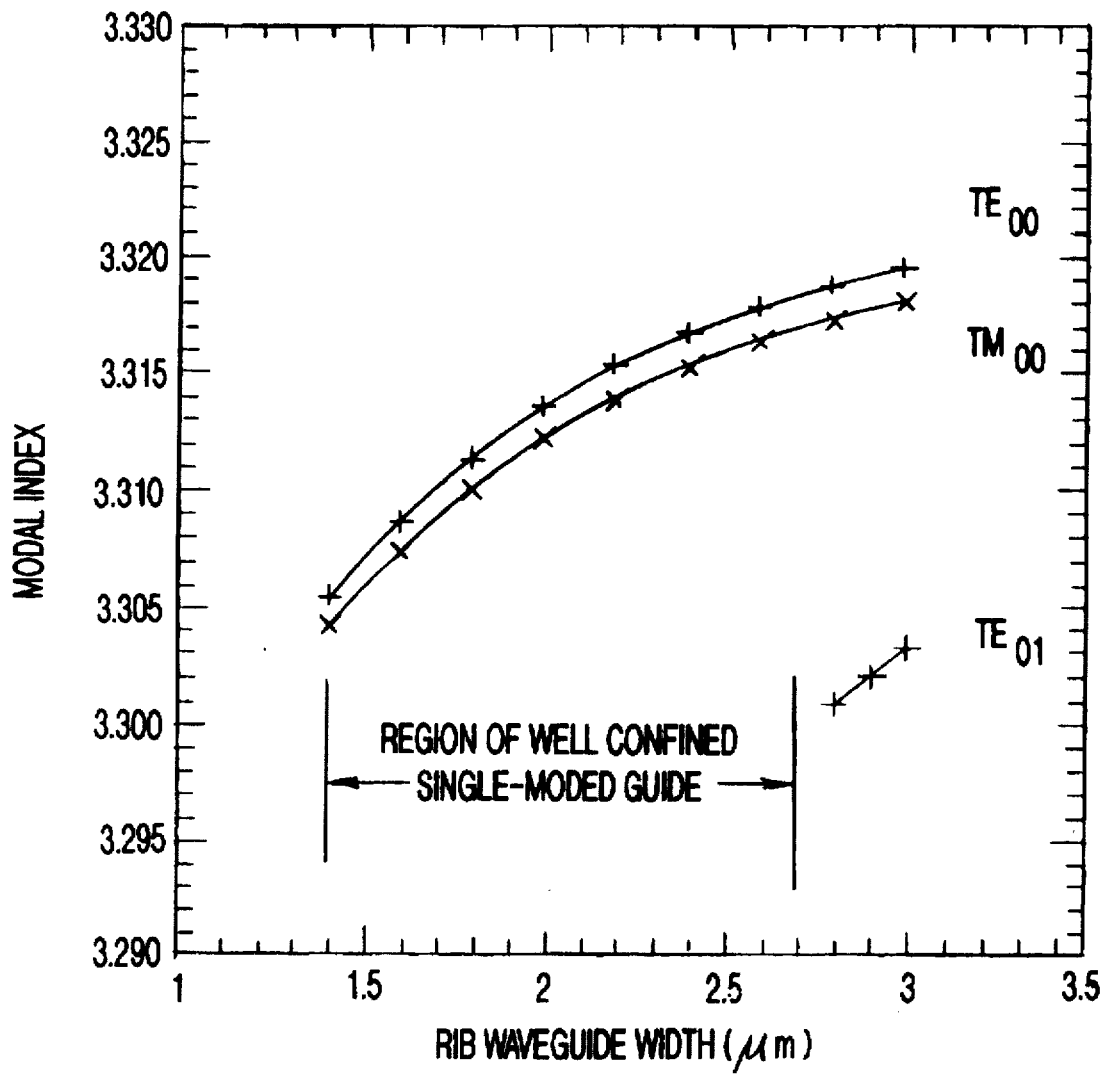
FIG. 5 is a graph showing the simulated modal index of the three lowest-order guided modes of the cutoff mesa rib waveguide as the rib width is varied from 1.4 to 3.0 μm and a preferred single mode region of operation for rib widths between about 1.4 to 2.7 μm.

Calculated modal indices of the $TE_{00}$, $TM_{00}$ and $TE_{01}$ guided modes for the structure of FIG. 4 with various rib widths are shown in FIG. 5. The solid lines in FIG. 5 are drawn through points representing individual calculations. Higher-order modes do not become guided until the rib width exceeds ~2.7 μm where the $TE_{01}$ mode becomes well confined. In these simulations a well confined mode is one which is fully confined within the waveguide structure using a 3.5 μm thick AlGaAs lower cladding layer. Modes whose calculated field profiles extend downward through a 3.5 μm thick cladding are expected to radiate strongly into the GaAs base layer 11 of the actual structure of FIG. 4 where a 2.5 μm thick lower cladding layer 15 is used. The useful region of single-moded rib waveguide width extends from an upper limit of ~2.7 μm, where the guide becomes multi-moded, to a lower limit of 1.4 μm, where the fundamental mode begins to penetrate quite far into the lower cladding layer and is no longer considered well-confined. In a similar fashion, the waveguide has been shown to exhibit single-mode behavior over a wide range of rib sidewall etch depths from a deep etch that protrudes well into the lower cladding to a shallow etch that terminates about 0.14 μm above the designed etch endpoint at the interface between the lower cladding layer 15 and the slab layer 16. Above this shallow etch limit, the mesa becomes guiding and supports high-order modes. Preservation of single-moded behavior for deep rib etches extending below the actual waveguide layer is a consequence of our particular choice of rib widths, slab layer thicknesses and cladding layer compositions and is not a feature of cutoff mesa rib waveguides in general. For example, increasing the rib width from 2.0 μm to 2.5 μm gives a waveguide which is single-moded for a rib etch with the same depth as in FIG. 4 but is multi-moded for a rib etch that extends down into the lower cladding layer.

To demonstrate operation of the cutoff mesa rib waveguide, straight waveguides and Mach-Zehnder Interferometers (MZI) using GaAs/AlGaAs rib waveguides identical to FIG. 4 were fabricated and tested with injection of TE polarized, 1.32 μm wavelength light. Epitaxial layers were grown using molecular-beam epitaxy. The upper and lower cladding layers were doped p and n-type respectively so that 2 mm long reverse-biased pn-junction phase modulators [of the type discussed in Mendoza-Alverez, Coldren, Alping, Yan, Hausken, Lee and Pedrotti, "Analysis of Depletion Edge Translation Lightwave Modulators," IEEE J. Lightwave Technol., vol. 6, pp. 793, June 1988] could be used for MZI modulation and waveguide loss measurements, using the Fabry-Perot interference method [see for example R. G. Walker, "Simple and Accurate Loss Measurement Technique for Semiconductor Optical Waveguides," Electron. Lett., vol. 21, pp. 581–582, 1985]. MZIs used 4° included angle Y-type optical power splitters, XY-type power combiners [of the type discussed in G. A. Vawter, G. R. Hadley, J. R. Wendt and J. F. Klem, "An Integrated Optical X-Y Coupler for Phase-Sensitive Optical Power Combining and Suppression of Radiated Light", in Conference on Lasers and Electro-Optics, Vol. 8, 1994 OSA Technical Digest Series, Optical Society of America, Washington, D.C., 1994, 8, pp. 76] and 2 mm radius waveguide bends. Ribs for both straight waveguides and MZIs were fabricated using direct-write electron-beam lithography and chlorine reactive-ion-beam etching (RIBE) [as discussed in G. A. Vawter, J. F. Klem and R. A. Leibenguth, "Improved Epitaxial Layer Design for Real-Time Monitoring of Dry-Etching in III-V Compound Heterostructures with Depth Accuracy of ±8 nm," J. Vac. Sci. Technol. A, vol. 12, pp. 1973–1977, July/August 1994]. Mesas were patterned using optical contact printing and etched by chlorine RIBE.

Waveguides and MZIs were tested using uncoated cleaved facets and end-fire coupling of light from a diode pumped YAG ring laser at 1.32 μm wavelength. The waveguides are single-moded (i.e. $TE_{00}$) with no evidence of any high order mesa modes. Attempts were made to launch high order mesa modes by misalignment of the NA=0.85 lens used to couple light into the waveguide. Such misalignment led only to extinction of the observed $TE_{00}$ mode. Measured transmission loss is 0.26±0.07 dB/mm assuming an uncoated facet reflectivity of 0.32±0.02. Transmission loss is limited by scattering at process-induced defects and by free-carrier absorption resulting from the doped pn-junction therein. Simulations including the effects of free-carriers due to impurity doping show that the lower limit of absorption due to free-carriers is about 0.05 dB/mm. MZIs have on-off contrast ratios as high as 14 dB. It is believed that the contrast ratio is limited by process-induced asymmetry in the y-splitter.

Although this invention has been described in the context of the preferred embodiment discussed above, other implementations are possible. For example, materials other than GaAs and AlGaAs can be utilized. For example other compound semiconductors in the Group III-V system such as InP/InGaAs and its variants may also be employed to make these structures. The dimensions of a particular structure will of course depend upon the wavelength of the light utilized and the optical properties of the materials employed. The true scope of the invention is to be found in the appended claims found below.

We claim:

1. A composite optical waveguide for use within a photonic integrated circuit with light of a particular wavelength comprising:

a cutoff mesa waveguide structure comprising a slab layer of thickness t at the upper surface of the mesa, said slab layer being underlain by a lower cladding layer, the mesa waveguide structure having a vertically asymmetric refractive index profile that is controlled by the thickness t and the chemical composition of the slab and the lower cladding layer such that the light does not propagate in a guided mode in the cutoff mesa waveguide structure by itself, the cutoff mesa being further defined by two parallel lateral walls to form an elongated structure; and an elongated rib waveguide structure formed atop the cutoff mesa waveguide structure and aligned therewith, the rib waveguide structure having a width less than the width of the cutoff mesa with the width and the chemical composition of the rib waveguide being such that only the $TE_{00}$ and $TM_{00}$ modes of the light are guided by the combination of the cutoff mesa waveguide structure and the rib waveguide structure in the region beneath the rib waveguide structure and no modes of the light are permitted in other regions of the cutoff mesa waveguide.

2. The waveguide of claim 1 wherein the elongated cutoff mesa structure comprises a base layer capped by the lower cladding layer of refractive index $n_0$ in turn capped by the slab layer of refractive index $n_1$.

3. The waveguide of claim 1 wherein the rib waveguide structure comprises an upper cladding layer placed adjacent to the slab layer, the upper cladding layer having a refractive index of $n_3$, where $n_3$ is less than the refractive index of the slab layer.

4. The waveguide of claim 2 wherein the refractive index, $n_2$, of the material present above the slab layer in the regions other than where the rib waveguide is present satisfies the condition $n_1 > n_0 > n_2$.

5. The waveguide of claim 2 wherein the lateral walls extend to at least the depth of the slab layer.

6. The waveguide of claim 3 wherein the lateral walls extend past the depth of the slab layer and into the lower cladding layer.

7. A composite optical waveguide for use within a photonic integrated circuit with light of a particular wavelength comprising:

an elongated cutoff mesa structure of width $w_1$ defined by lateral walls with the cutoff mesa structure comprising a base layer capped by a lower cladding layer of refractive index $n_0$ in turn capped by a slab layer of refractive index $n_1$ and thickness t; and an elongated rib waveguide structure of width $w_2$ approximately centered atop the cutoff mesa structure and aligned therewith and comprising an upper cladding layer adjacent to the slab layer, the upper cladding layer having a refractive index of $n_3$, wherein $w_1 > w_2$ and the refractive index, $n_2$, of the material present above the slab layer in the regions other than where the upper cladding layer is present satisfies the condition $n_1 > n_0 > n_2$, such that only the fundamental modes of the light are guided by the composite optical waveguide structure comprising the cutoff mesa structure and the rib waveguide structure.

8. The waveguide of claim 7 wherein the lateral walls of the cutoff mesa structure are at least as high as the depth of the slab layer.

9. The waveguide of claim 7 wherein the elongated cutoff mesa structure additionally includes a first graded interface layer between the lower cladding layer and the slab layer.

10. The waveguide of claim 9 wherein the waveguide additionally includes a second graded interface layer between the slab layer and the upper cladding layer.

11. The waveguide of claim 7 wherein the optical waveguide also includes a first electrode located above the upper cladding layer.

12. The waveguide of claim 11 additionally comprising a second electrode formed below the lower cladding layer.

13. The waveguide of claim 12 further including a p-n junction formed about the slab layer.

14. The waveguide of claim 7 wherein the slab layer comprises GaAs.

15. The waveguide of claim 7 wherein the lower cladding layer comprises AlGaAs.

16. The waveguide of claim 7 wherein the slab layer comprises GaAs.

17. The waveguide of claim 7 wherein the upper cladding layer comprises AlGaAs.

18. The waveguide of claim 7 wherein the lateral walls include the slab layer and at least part of the lower cladding layer.

19. The waveguide of claim 7 wherein the particular wavelength of light is within a wavelength range of about 1–1.6 μm.

* * * * *